W. Choate,
Paddle Wheel.
N° 50,417.       Patented Oct. 10, 1865.

Witnesses:       Inventor:

UNITED STATES PATENT OFFICE.

WILLIAM CHOATE, OF NEWBURYPORT, MASS., ASSIGNOR TO HIMSELF, WM. TEEL, JOHN WHITMORE, AND O. W. CLARK, OF SAME PLACE.

IMPROVED PADDLE-WHEEL.

Specification forming part of Letters Patent No. 50,417, dated October 10, 1865.

*To all whom it may concern:*

Be it known that I, WILLIAM CHOATE, of Newburyport, in the county of Essex and State of Massachusetts, have invented a new and Improved Paddle-Wheel; and I do hereby declare that the following is a full, clear, and exact description thereof, which will enable those skilled in the art to make and use the same, reference being had to the accompanying drawings, forming part of this specification, in which—

Figure 2:
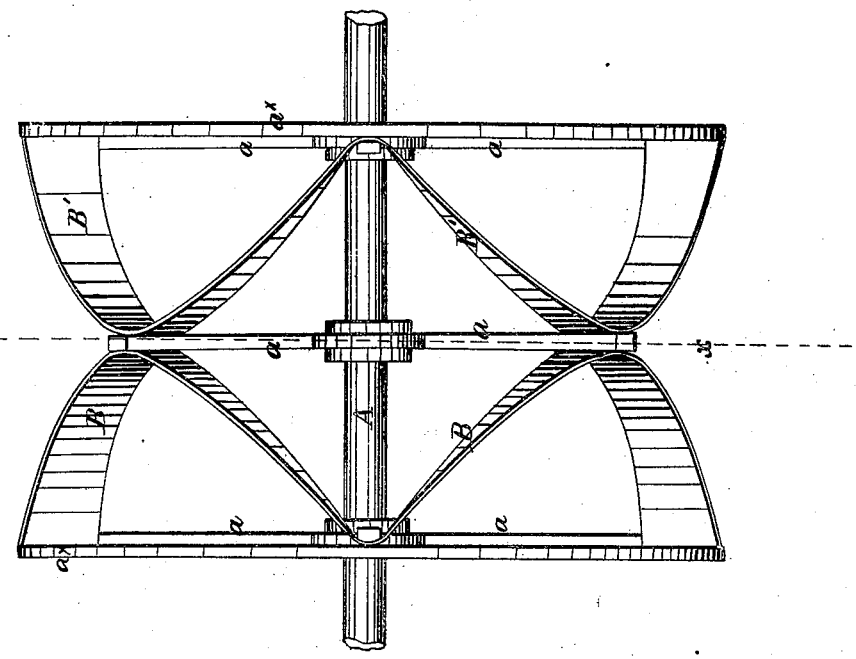
Figure 1:
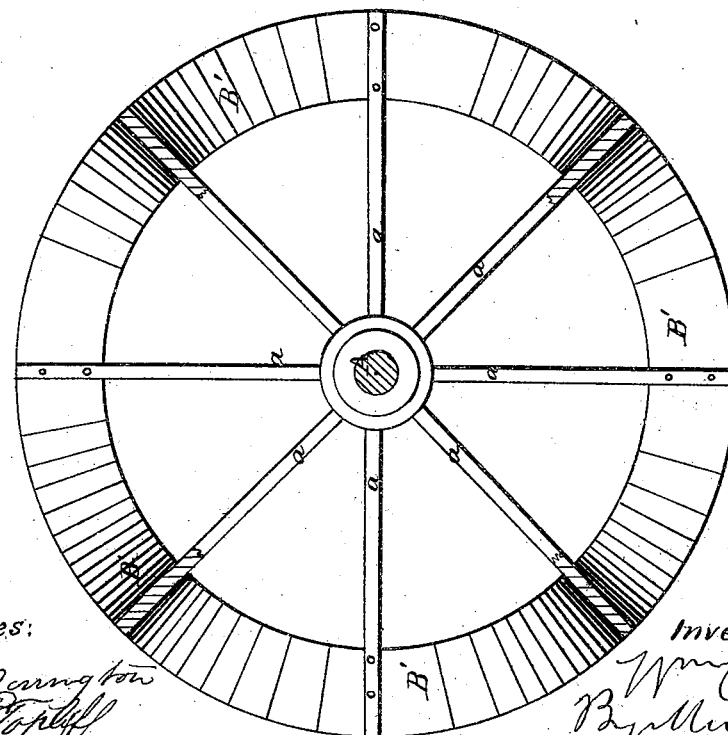

Figure 1 is a side sectional view of my invention, taken in the line $x\ x$, Fig. 1; Fig. 2, a face view of the same.

Similar letters of reference indicate corresponding parts.

The object of this invention is to obtain a paddle-wheel by which the "lift" and "plunge" now occasioned by the entrance and emerging of the floats of the ordinary wheels into and out of the water will be avoided, and a great saving of power effected, as well as an avoidance of the jars and concussions attending the operation of the ordinary paddle-wheels.

My invention consists in the employment or use of diagonal curved floats, applied to the wheel in the manner substantially as hereinafter set forth.

A represents the shaft of the paddle-wheel, which has three sets of radial arms, $a$, attached to it at equal distances apart. The arms $a$ of the two outer sets coincide or are in line with each other, while the arms of the central set are in line with the centers of the spaces between the arms of the other two sets.

B B' represent the floats, of which there are two sets, secured in the two spaces formed by the three sets of arms. These floats are secured by bolts or otherwise to the ends of the arms $a$, the ends of the floats being secured to the outer sets, and the center of them secured to the central set, as shown clearly in Fig. 2. The floats, in consequence of being curved to admit of this mode of attachment, have an oblique curved or spiral form, as shown in Fig. 2, each float extending spirally inward from an outer arm $a$ to a central arm $a$, and thence outward to an outer arm. The two outer sets of arms have rims $a^\times$ attached to them.

By this arrangement the floats enter the water without any jar or concussion and leave it without the lift, and hence a great saving in power is effected, and much wear and tear of machinery avoided, as well as straining of the vessel.

Having thus described my invention, I claim as new and desire to secure by Letters Patent—

A paddle-wheel constructed with three sets of arms, with floats attached to them, so as to have a diagonal curved position, substantially as herein shown and described.

WILLIAM CHOATE.

Witnesses:
ROBERT HARROWER,
W. A. SMITH.